(12) United States Patent
Farooq et al.

(10) Patent No.: US 11,639,153 B2
(45) Date of Patent: May 2, 2023

(54) SEATBELT ASSEMBLY INCLUDING RESILIENT MATERIAL

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US); Saeed D. Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/409,837

(22) Filed: Aug. 24, 2021

(65) Prior Publication Data

US 2023/0064776 A1 Mar. 2, 2023

(51) Int. Cl.
*B60R 22/28* (2006.01)
*B60R 22/24* (2006.01)
*B60R 22/20* (2006.01)
*B60R 22/18* (2006.01)

(52) U.S. Cl.
CPC ............ *B60R 22/28* (2013.01); *B60R 22/201* (2013.01); *B60R 22/24* (2013.01); *B60R 2022/1831* (2013.01); *B60R 2022/208* (2013.01); *B60R 2022/282* (2013.01); *B60R 2022/288* (2013.01)

(58) Field of Classification Search
CPC .... B60R 2/19; B60R 2/24; B60R 2/28; B60R 2022/282; B60R 2022/288
See application file for complete search history.

(56) References Cited

U.S. PATENT DOCUMENTS

| | | | | | |
|---|---|---|---|---|---|
| 4,173,357 | A | * | 11/1979 | Jahn | B60R 22/201 297/483 |
| 4,234,210 | A | * | 11/1980 | McNally | B60R 22/06 297/469 |
| 4,615,540 | A | * | 10/1986 | Sedlmayr | B60R 22/1951 297/480 |
| 5,294,150 | A | * | 3/1994 | Steffens, Jr. | B60R 22/1951 297/480 |
| 5,346,152 | A | * | 9/1994 | Fohl | B60R 22/1952 280/806 |
| 5,358,310 | A | * | 10/1994 | Nemoto | B60R 22/201 297/483 |
| 5,366,245 | A | * | 11/1994 | Lane, Jr. | B60R 22/1955 297/480 |
| 5,390,982 | A | * | 2/1995 | Johnson | B60N 2/829 297/483 |
| 5,628,529 | A | * | 5/1997 | Golz | B60R 22/201 280/808 |

(Continued)

*Primary Examiner* — Barry Gooden, Jr.
(74) *Attorney, Agent, or Firm* — Frank A. MacKenzie; Bejin Bieneman PLC

(57) ABSTRACT

A vehicle includes a vehicle body having a pillar. The vehicle includes a track supported by the pillar. The vehicle includes a bar supported by the track. The bar is slidable relative to the track from a raised position to a lowered position. The vehicle includes a seatbelt webbing extending over the bar. The vehicle includes a piston supported by the pillar. The piston includes a piston rod connected to the bar and a piston cylinder supported by the pillar. The piston rod and the piston cylinder define a volume filled with a resilient material.

20 Claims, 8 Drawing Sheets

(56) References Cited

U.S. PATENT DOCUMENTS

| | | | | |
|---|---|---|---|---|
| 5,700,034 A * | 12/1997 | Lane, Jr. | | B60R 21/01 280/805 |
| 5,924,729 A * | 7/1999 | Gleason | | B60R 22/28 280/805 |
| 6,145,881 A * | 11/2000 | Miller, III | | B60R 22/20 280/808 |
| 6,168,205 B1 * | 1/2001 | Smithson | | B60R 22/28 280/805 |
| 6,193,275 B1 * | 2/2001 | Knox | | B60R 22/03 280/808 |
| 6,527,298 B2 * | 3/2003 | Kopetzky | | B60R 22/1958 297/483 |
| 6,732,968 B2 * | 5/2004 | Yoon | | B60R 22/1951 280/806 |
| 6,786,511 B2 * | 9/2004 | Heckmayr | | B60R 22/3413 280/805 |
| 6,871,877 B2 * | 3/2005 | Herrmann | | B60R 22/1955 280/805 |
| 7,121,375 B2 * | 10/2006 | Becker | | B60R 22/1951 180/268 |
| 7,226,131 B2 * | 6/2007 | Meneses | | B60R 22/26 297/483 |
| 7,350,734 B2 * | 4/2008 | Stevens | | B60R 22/1955 297/480 |
| 7,540,537 B2 * | 6/2009 | Bell | | B60R 22/1951 280/806 |
| 7,584,990 B2 * | 9/2009 | Suyama | | B60R 21/207 297/483 |
| 8,469,401 B2 * | 6/2013 | Humbert | | B60R 22/195 297/480 |
| 8,800,735 B2 * | 8/2014 | Ruthinowski | | F16F 1/445 280/805 |
| 8,820,789 B2 * | 9/2014 | Merrill | | B60R 22/26 297/480 |
| 9,623,836 B2 * | 4/2017 | Kujawa | | B60R 22/24 |
| 10,286,872 B2 | 5/2019 | Faruque et al. | | |
| 10,369,962 B2 | 8/2019 | Faruque et al. | | |
| 10,486,644 B2 * | 11/2019 | Faruque | | B60R 22/4676 |
| 10,501,038 B2 * | 12/2019 | Jaradi | | B60N 2/688 |
| 10,562,488 B2 * | 2/2020 | Faruque | | F16F 9/06 |
| 10,953,847 B2 * | 3/2021 | Hamilton | | B60R 22/202 |
| 2002/0047256 A1 * | 4/2002 | Kopetzky | | B60R 22/1958 280/801.1 |
| 2002/0084645 A1 * | 7/2002 | Lobert | | B60R 22/1951 280/806 |
| 2003/0116954 A1 * | 6/2003 | Singer | | B60R 22/24 280/801.1 |
| 2004/0113412 A1 * | 6/2004 | Go | | B60N 2/688 280/808 |
| 2004/0256167 A1 * | 12/2004 | Becker | | B60R 22/1951 180/268 |
| 2005/0017497 A1 * | 1/2005 | Hirotani | | B60R 22/023 280/807 |
| 2005/0023815 A1 * | 2/2005 | Hoffmann | | B60R 22/24 280/801.2 |
| 2005/0206198 A1 * | 9/2005 | Kajiwara | | B60R 13/025 296/191 |
| 2006/0042850 A1 * | 3/2006 | Mendis | | B60R 22/28 180/268 |
| 2007/0013186 A1 * | 1/2007 | Bell | | B60R 22/1951 280/806 |
| 2007/0085318 A1 * | 4/2007 | Stevens | | B60R 22/1955 280/806 |
| 2009/0014994 A1 * | 1/2009 | Bell | | B60R 22/1951 280/806 |
| 2009/0045615 A1 * | 2/2009 | Bell | | B60R 22/1951 280/806 |
| 2010/0207373 A1 * | 8/2010 | Kardel | | B60R 22/24 280/801.1 |
| 2012/0025588 A1 * | 2/2012 | Humbert | | B60R 22/26 297/480 |
| 2016/0121846 A1 * | 5/2016 | Kujawa | | B60R 22/1952 280/801.1 |
| 2018/0297546 A1 * | 10/2018 | Faruque | | B60R 21/045 |
| 2018/0319362 A1 * | 11/2018 | Faruque | | F16F 9/30 |
| 2018/0319363 A1 * | 11/2018 | Faruque | | B60R 22/4676 |
| 2018/0319364 A1 * | 11/2018 | Faruque | | B60R 22/4633 |
| 2018/0326940 A1 * | 11/2018 | Faruque | | F16F 5/00 |
| 2019/0263350 A1 * | 8/2019 | Ruthinowski | | A44B 11/2557 |
| 2019/0275983 A1 * | 9/2019 | Hamilton | | B60R 22/30 |

* cited by examiner ial. The resilient material may be a heterogeneous mixture of a liquid and hydrophobic, nanoporous particles. The volume may be smaller in the lowered position than in the raised position.
SEATBELT ASSEMBLY INCLUDING RESILIENT MATERIAL

BACKGROUND

A seatbelt system may include a retractor for paying out seatbelt webbing. The retractor includes a spool around which the webbing is wrapped. The webbing unwinds from the spool when the webbing is buckled by the seat occupant. In the event of a vehicle impact, the spool is locked, preventing its rotation, and preventing any further unwinding of the webbing. The locking, in combination with an inertia of the occupant, may result in a resistive load of the webbing against the occupant. A load limiting mechanism within the retractor allows webbing to payout under impact loading to prevent occupant loads from exceeding predetermined levels. A known load limiting mechanism includes a torsion bar disposed in a center of the spool. The torsion bar may be a cylindrical bar of steel having a yield strength selected to allow the bar to torsionally yield at a value associated with a potential threshold of resistive load. Twisting of the torsion bar allows webbing to come off the retractor spool under high loads, thereby controlling the loads sustained by the occupant against the webbing during an impact.

DETAILED DESCRIPTION

Figure 1:
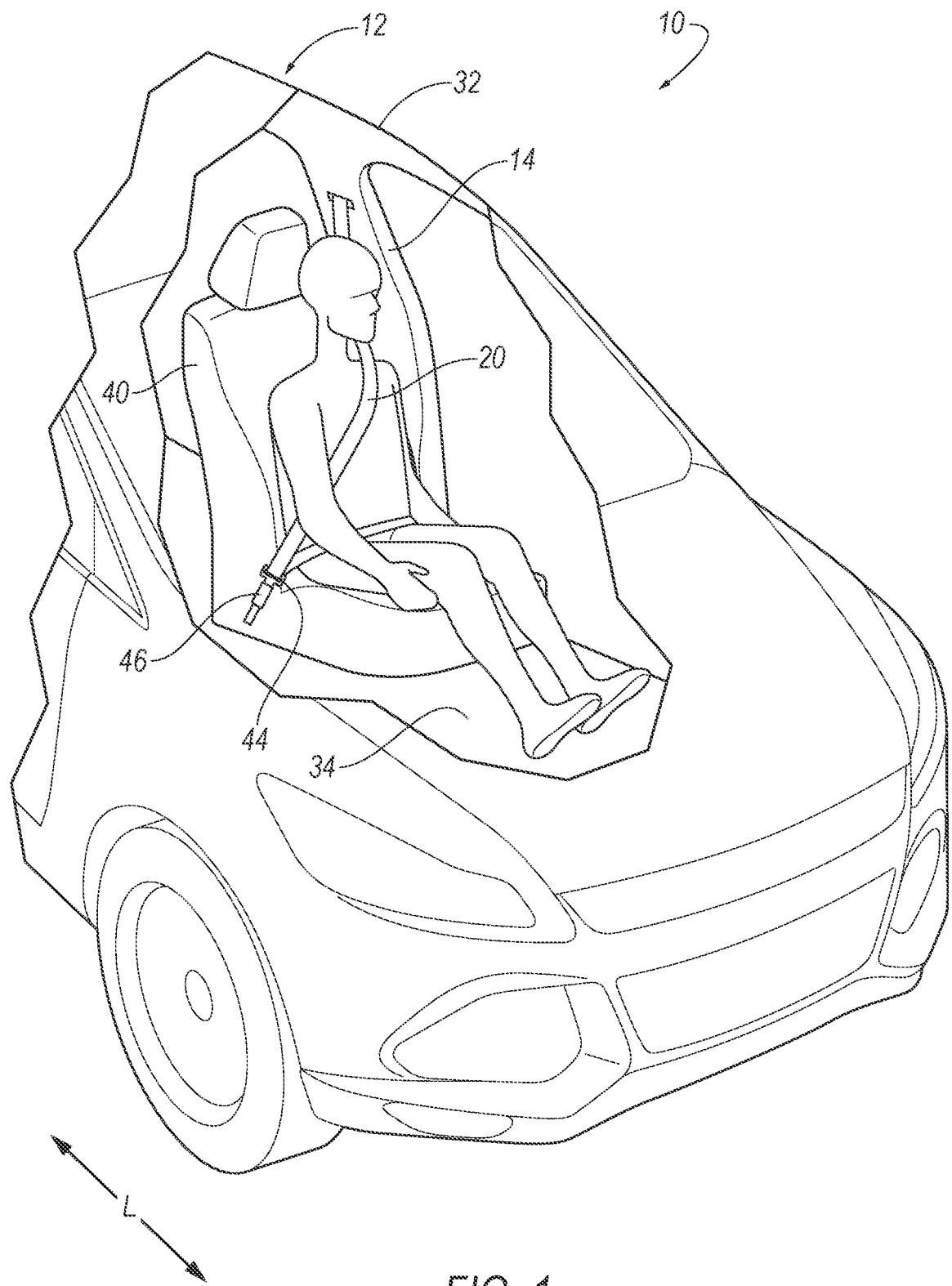
FIG. 1 is perspective view of a vehicle having a seatbelt assembly supported by a pillar.

A vehicle includes a vehicle body having a pillar. The vehicle includes a track supported by the pillar. The vehicle includes a bar supported by the track. The bar is slidable relative to the track from a raised position to a lowered position. The vehicle includes a seatbelt webbing extending over the bar. The vehicle includes a piston supported by the pillar. The piston includes a piston rod connected to the bar and a piston cylinder supported by the pillar. The piston rod and the piston cylinder define a volume filled with a resilient material.

The resilient material may be a heterogeneous mixture of a liquid and hydrophobic, nanoporous particles.

The volume may be smaller in the lowered position than in the raised position.

The bar may be movable a length along the track by the seatbelt webbing, the volume being proportional to the length the bar moves along the track.

The resilient material may bias the piston rod toward the raised position.

The piston rod may be between the bar and the resilient material.

The piston may be supported by the track.

The bar may be rotatable relative to the pillar.

The track may define a slot elongated along the pillar, the bar being slidable along the slot.

The piston rod may bias the bar along the slot toward the raised position.

The vehicle may include a second track spaced from the track, the bar being supported by the second track and slidable relative to the second track from the raised position to the lowered position.

The track may be elongated along an axis, the piston rod being movable along the axis from the raised position to the lowered position.

The seatbelt webbing may apply a force downwardly along the axis to the bar, the bar and the piston rod being movable downwardly along the axis when the force reaches a non-zero threshold.

The seatbelt webbing may apply a force downwardly on the bar, the bar and the piston rod being movable downwardly along the track when the force reaches a non-zero threshold.

The volume may decrease as the force is applied to the bar by the seatbelt webbing.

The piston rod may be movable axially relative to the piston cylinder by the bar.

The vehicle may include a seatbelt retractor including a spool about which the seatbelt webbing is coiled, the spool being lockable and the bar being slidable to the lowered position along the track when the spool is locked.

An assembly includes a track. The vehicle includes a bar supported by the track. The bar is slidable relative to the track from a raised position to a lowered position. The vehicle includes a seatbelt webbing extending over the bar. The vehicle includes a piston supported by the pillar. The piston includes a piston rod connected to the bar and a piston cylinder supported by the pillar. The piston rod and the piston cylinder define a volume filled with a resilient material.

The resilient material may be a heterogeneous mixture of a liquid and hydrophobic, nanoporous particles.

The volume may be smaller in the lowered position than in the raised position.

With reference to the Figures, wherein like numerals indicate like parts throughout the several views, a vehicle 10 includes a vehicle body 12 having a pillar 14. The vehicle 10 includes a track 16 supported by the pillar 14. The vehicle 10 includes a bar 18 supported by the track 16. The bar 18 is slidable relative to the track 16 from a raised position to a lowered position. The vehicle 10 includes a seatbelt webbing 20 extending over the bar 18. The vehicle 10 includes a piston 22 supported by the pillar 14. The piston 22 includes a piston rod 24 connected to the bar 18 and a piston cylinder 28 supported by the pillar 14. The piston rod 24 and the piston cylinder 28 define a volume 26 filled with a resilient material 30.

In the event of an impact to the vehicle 10 where sudden deceleration may occur, a force may be applied to the seatbelt webbing 20 to control the kinematics of the occupant. The force may slide the bar 18 along the track 16 from the raised position to the lowered position and move the piston rod 24 downwardly to compress the resilient material 30. The resilient material 30 allows for controlled limitation of a resistive load on the occupant by allowing for additional payout of the seatbelt webbing 20 as the piston rod 24 compresses the resilient material 30. The resilient material 30 may be adaptive to different sized and shaped occupants to allow for controlled limitation of the resistive load on the occupant. The addition of the piston 22 and resilient material 30 may replace a torsion bar of the seatbelt retractor 42 to limit the resistive load on the occupant in the event of an impact.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

The vehicle body 12 may define a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle body 12 includes two roof rails (not numbered). The roof rails are spaced from one another in a cross-vehicle direction. The roof rails each extend longitudinally along the vehicle body 12, i.e., along a vehicle-longitudinal axis L.

The vehicle body 12 includes a vehicle roof 32 and a vehicle floor 34 spaced downwardly from the vehicle roof 32. The vehicle roof 32 may define the upper boundary of the passenger compartment and may extend from the front end of the passenger compartment to the rear end of the passenger compartment. The vehicle roof 32 may extend from one roof rail to the other roof rail. The vehicle roof 32 may be irremovably fixed to the roof rails. In other words, the vehicle roof 32 is secured to the roof rails in such a way that removal requires destruction such as cutting, e.g., cutting material and/or welded joints, etc. As an example, the vehicle roof 32 may be attached to both roof rails, e.g., by welding, fasteners, etc.

Figure 2:
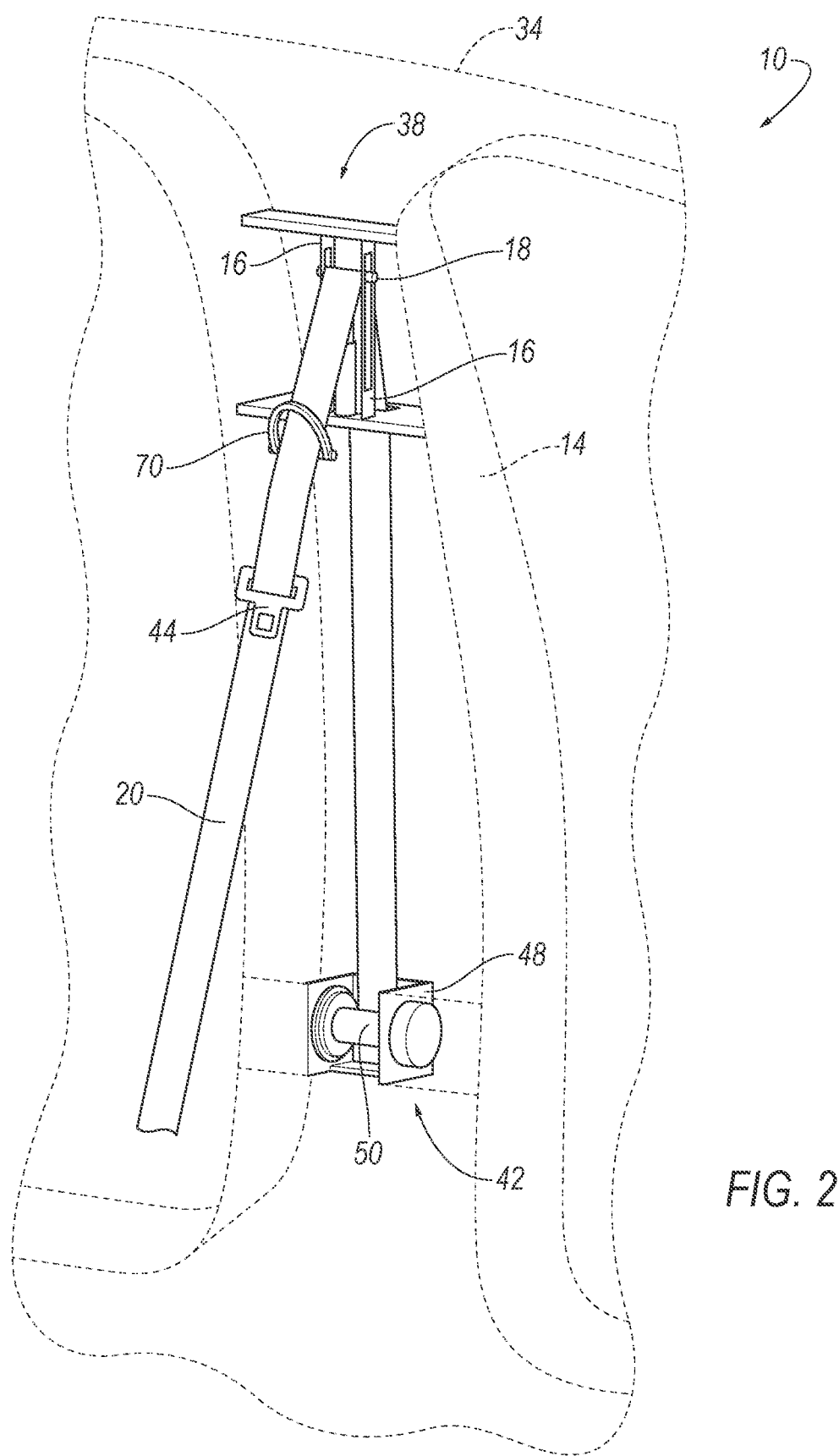
FIG. 2 is a perspective view of the seatbelt assembly supported by the pillar

With reference to FIGS. 1 and 2, the vehicle body 12 includes a plurality of pillars 14. For example, the vehicle body 12 may include an A-pillar and a B-pillar on each side of the vehicle 10. The A-pillars may extend between a windshield (not shown) and front doors (not numbered) of the vehicle 10. In other words, the A-pillars may be disposed at the front end of the passenger cabin. The B-pillars may extend behind front doors, e.g., between adjacent doors. In other words, the B-pillars may be spaced from the A-pillars along the vehicle-longitudinal axis L. The vehicle 10 may include additional pillars 14, e.g., C-pillars, D-pillars 14. The pillars 14 may extend from the vehicle roof 32 to the vehicle floor 34.

The vehicle 10 may include one or more seats 40. Specifically, the vehicle 10 may include any suitable number of seats 40. The seats 40 are supported by the vehicle floor 34. The seats 40 may be arranged in any suitable arrangement in the passenger compartment. As in the example shown in the Figures, one or more of the seats 40 may be at the front end of the passenger compartment, e.g., a driver seat 40 and/or a passenger seat 40. In other examples, one or more of the seats 40 may be behind the front end of the passenger compartment, e.g., at the rear end of the passenger compartment. The seats 40 may be movable relative to the vehicle floor 34 to various positions, e.g., movable fore-and-aft and/or cross-vehicle. The seat 40 may be of any suitable type, e.g., a bucket seat 40. The seats 40 may be adjacent the door openings in the vehicle body 12.

With reference to FIGS. 1-4, the vehicle 10 includes a seatbelt assembly 38 supported by the vehicle body 12. Specifically, the seatbelt assembly 38 is supported by a pillar 14 of the vehicle 10. In the example shown in the Figures, the seatbelt assembly 38 is supported by the B-pillar of the vehicle body 12. The seatbelt assembly 38 may be supported by any suitable pillar 14, e.g., a C-pillar or a D-pillar. The seatbelt assembly 38 may be disposed adjacent the seat 40. For example, as shown in the Figures, the seatbelt assembly 38 is adjacent a front seat 40. The seatbelt assembly 38 may be adjacent any seat 40 in the vehicle 10. The vehicle 10 may include any suitable number of seatbelt assemblies 38 supported by any suitable pillar 14 of the vehicle 10.

The seatbelt assembly 38 may include a seatbelt retractor 42 and the seatbelt webbing 20 retractably payable from the seatbelt retractor 42. The seatbelt assembly 38 may include an anchor (not shown) coupled to the seatbelt webbing 20, and a clip 44 that engages a buckle 46. The seatbelt assembly 38, when fastened, retains an occupant on the seat 40, e.g., during sudden decelerations of the vehicle 10. The seatbelt webbing 20 may extend continuously from the seatbelt retractor 42 to the anchor. For example, one end of the seatbelt webbing 20 feeds into the seatbelt retractor 42, and the other end of the seatbelt webbing 20 is fixed to the anchor. The anchor may, for example, be fixed to the seat 40. Alternatively, the anchor may be fixed to the vehicle body 12, e.g., the B-pillar, the vehicle floor 34, etc. The anchor may be attached to the seat 40 in any suitable manner, e.g., with fasteners.

With reference to FIG. 2, the seatbelt retractor 42 includes a housing 48 and a spool 50 rotatably coupled to the housing 48. The spool 50 may have a cylindrical shape. The seatbelt webbing 20 may be coiled about the spool 50. The seatbelt retractor 42, e.g., the spool 50, may be lockable from an unlocked position to a locked position. In the unlocked position, the seatbelt webbing 20 may be extended from and retracted into the seatbelt retractor 42. In other words, the seatbelt webbing 20 may be coiled and uncoiled freely about the spool 50. In the locked position, the seatbelt retractor 42 prevents extension of the seatbelt webbing 20 to limit the forward movement of the occupant. In other words, the seatbelt webbing 20 may not be uncoiled from the spool 50 in the locked position. The seatbelt retractor 42 may be in the unlocked position by default, i.e., in the absence of a sudden deceleration. The seatbelt retractor 42 may change from the unlocked position to the locked position during a sudden deceleration of the vehicle 10, i.e., the deceleration may trigger components of the seatbelt retractor 42 to change from the unlocked position to the locked position, e.g., the spool 50.

The seatbelt retractor 42 may be mounted to the vehicle body 12. Specifically, the housing 48 of the seatbelt retractor 42 is mounted to the vehicle body 12. As in the example shown in the Figures, the seatbelt retractor 42 may be mounted to the B-pillar. As another example, when the seatbelt assembly 38 is adjacent a rear seat 40 of the vehicle 10, the seatbelt retractor 42 may be mounted to the C-pillar. In further examples, the seatbelt retractor 42 may be attached to the seat 40. The seatbelt retractor 42 may be attached to the vehicle body 12 in any suitable manner, e.g., fasteners.

The seatbelt webbing 20 may be fabric, e.g., woven nylon. The clip 44 slides freely along the seatbelt webbing 20 and, when engaged with the buckle 46, divides the seatbelt webbing 20 into a lap band and a shoulder band. The seatbelt assembly 38 may include a D-ring 70 engaged with the seatbelt webbing 20. For example, the seatbelt webbing 20 may freely slide through the D-ring 70. In other words, the seatbelt webbing 20 may extend from the anchor through the D-ring 70 to the seatbelt retractor 42. The D-ring 70 may be spaced upwardly along the pillar 14 from the seatbelt retractor 42. For example, the D-ring 70 may be disposed between the seatbelt retractor 42 and the vehicle roof 32. As another example, the seatbelt retractor 42 may be adjacent to the vehicle floor 34 and the D-ring 70 may be adjacent to the vehicle roof 32. The D-ring 70 may be fixed to the vehicle body 12, e.g., the B-pillar. The seatbelt assembly 38 may be a three-point harness, meaning that the seatbelt webbing 20 extends between three points around the occupant when fastened, specifically the anchor, the buckle 46, and the D-ring 70. The seatbelt assembly 38 may, alternatively, include any suitable arrangement of points along the seatbelt webbing 20.

Figure 3A:
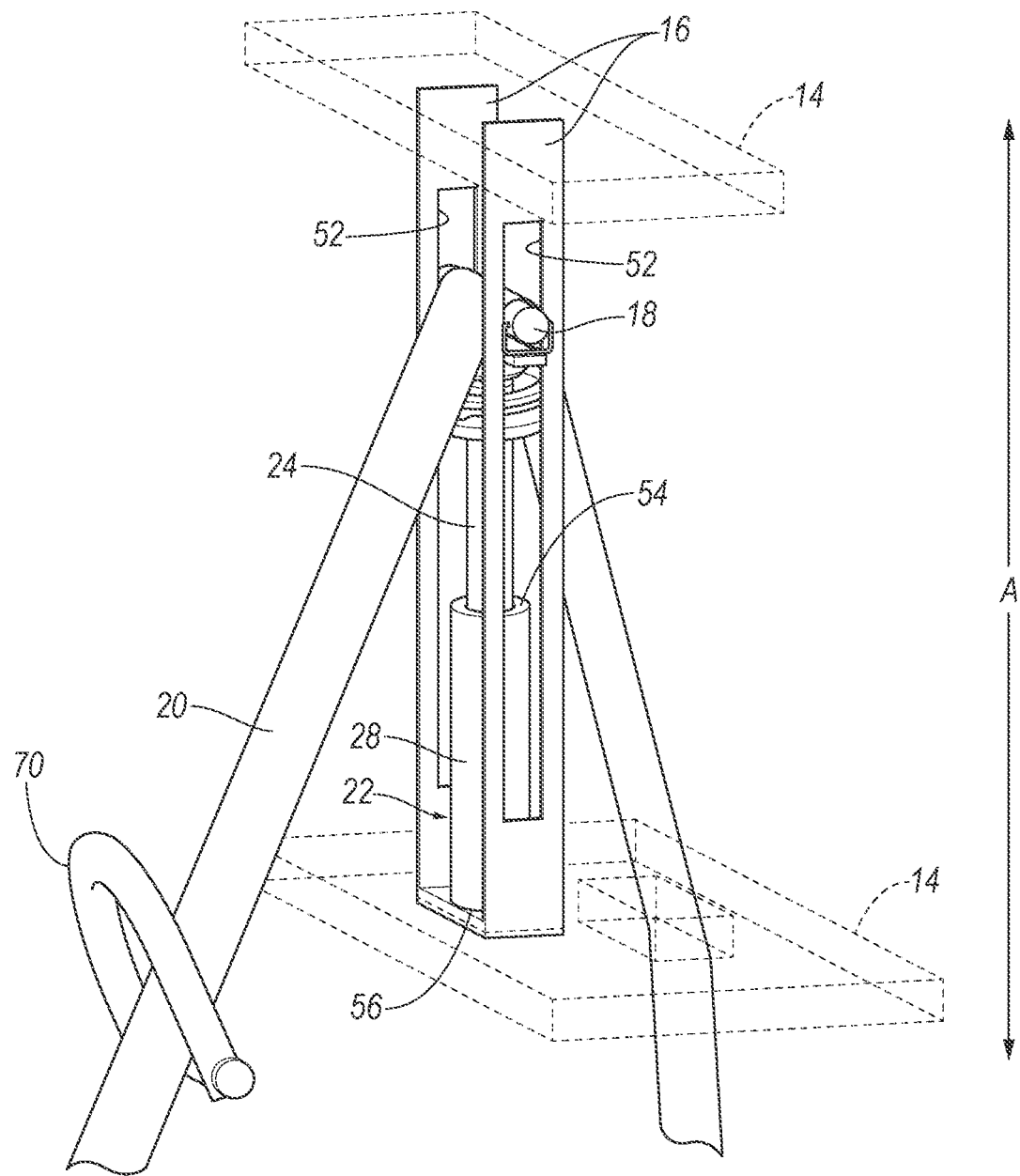
FIG. 3A is a perspective view of the seatbelt assembly having a piston and a bar in a raised position.
Figure 3B:
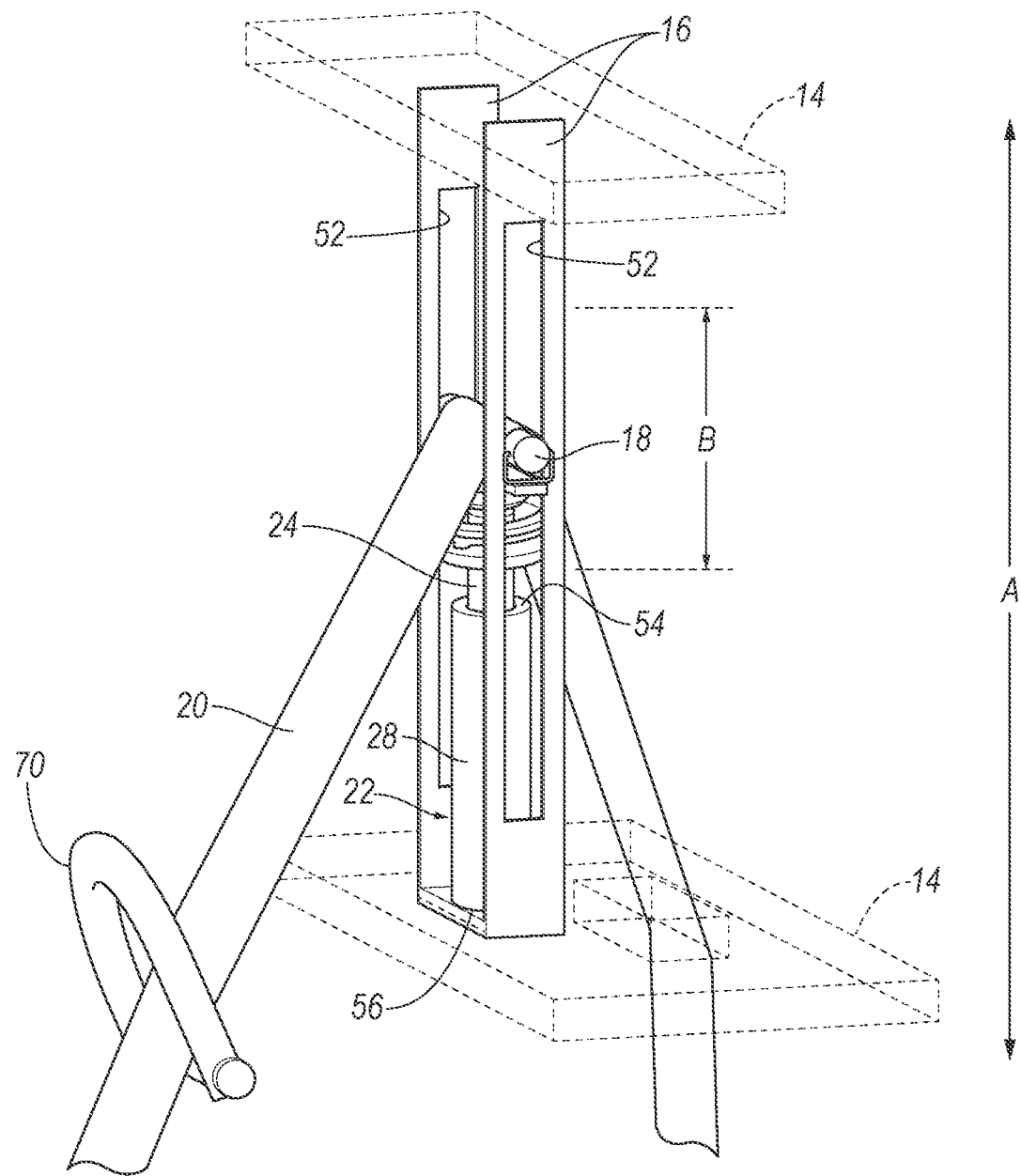
FIG. 3B is a perspective view of the seatbelt assembly having the piston and the bar in a lowered position.
Figure 4:
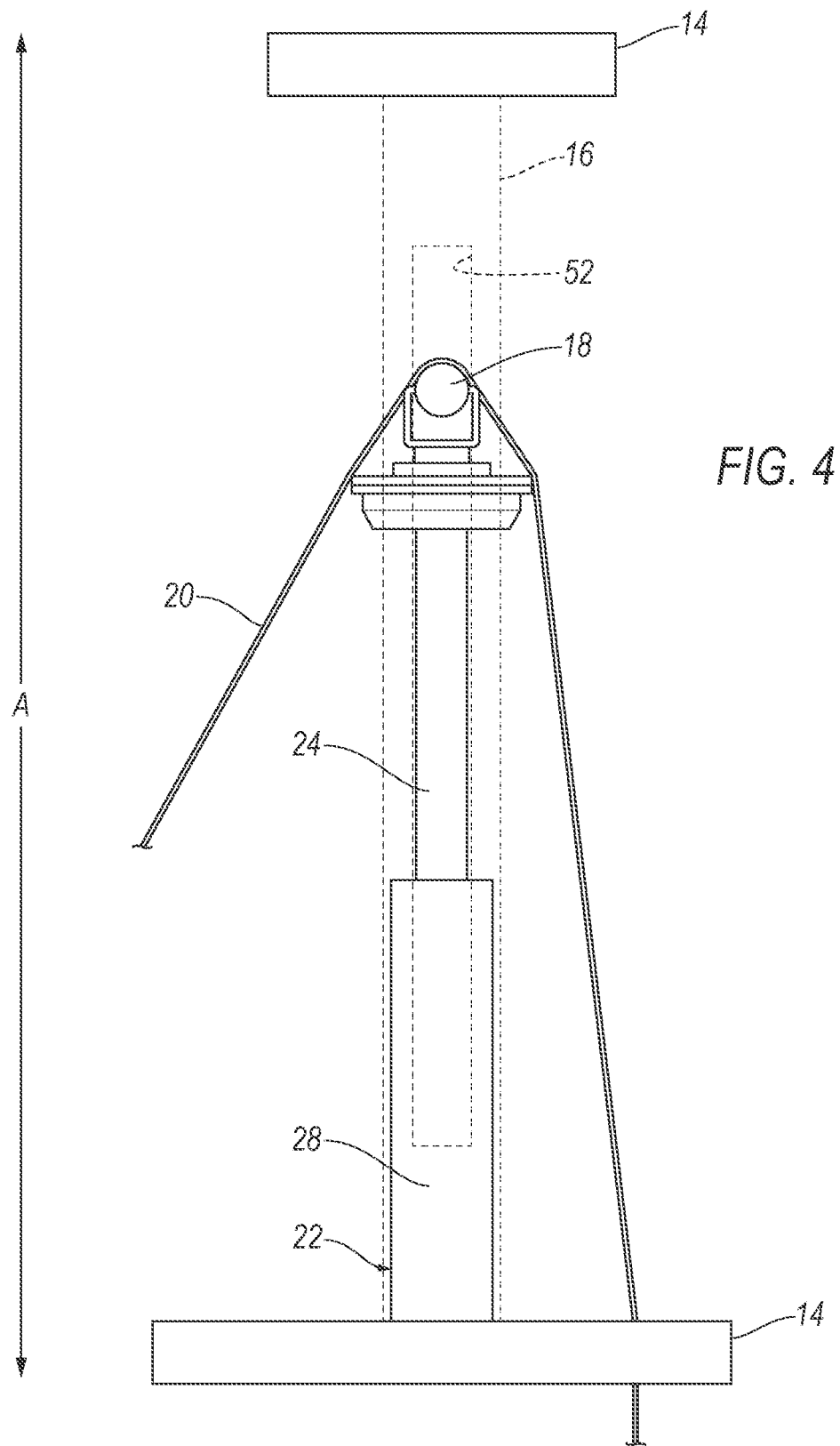
FIG. 4 is a side view of the seatbelt assembly.
Figures 5A, 5B:
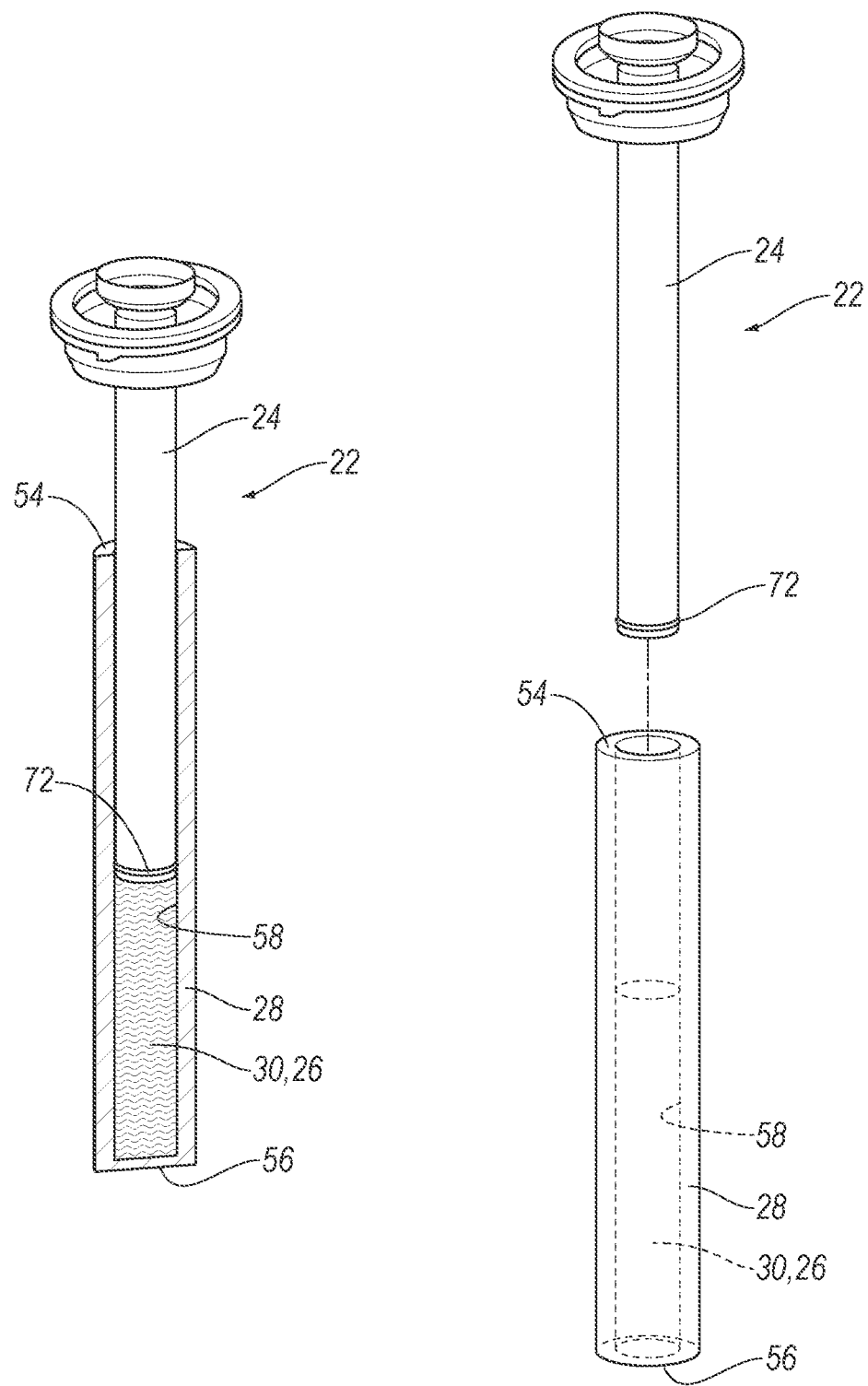
FIG. 5A is a perspective view of the piston having a piston rod and piston cylinder.
FIG. 5B is an exploded view of the piston having a piston rod and piston cylinder.

With reference to FIGS. 2-4, the seatbelt assembly 38 includes one or more tracks 16 supported by the pillar 14. In the example shown in the Figures, the seatbelt assembly 38 includes two tracks 16 supported by the pillar 14. In other examples, the seatbelt assembly 38 may include any suitable number of tracks 16 supported by the pillar 14. The tracks 16 are spaced from each other along the vehicle-longitudinal axis L. The tracks 16 are elongated along an axis A extending along the pillar 14. The tracks 16 each define a slot 52 elongated along the axis A. In other words, the tracks 16 may extend on the axis A or spaced from the axis A.

The seatbelt assembly 38 includes the bar 18 slidably supported by the pillar 14, specifically, slidably supported by the tracks 16. The bar 18 is slidable relative to the pillar 14 and track 16 along the axis A from the raised position to the lowered position. Specifically, the bar 18 is slidable along the slot 52 of the track 16 as the bar 18 moves between the raised position and the lowered position. In other words, the bar 18 is slidable along the axis A as the bar 18 moves between the raised position and the lowered position. The bar 18 is movable along the tracks 16 by the seatbelt webbing 20. The seatbelt webbing 20 may apply a force downwardly along the axis A to the bar 18, e.g., the force may be by an occupant in the event of an impact to the vehicle 10. In response to the applied force, the bar 18 is movable downwardly along the axis A. The bar 18 is movable a length B along the track 16 as the bar 18 moves between the raised position and the lowered position.

The bar 18 is rotatable relative to the pillar 14. As the seatbelt webbing 20 is coiled or uncoiled about the spool 50 of the seatbelt retractor 42, the seatbelt webbing 20 rotates the bar 18 relative to the pillar 14. The rotation of the bar 18 allows the seatbelt webbing 20 to smoothly coil and uncoil about the spool 50 of the seatbelt retractor 42. The bar 18 may be in the raised position when the spool 50 of the seatbelt retractor 42 is in the unlocked position and the bar 18 is slidable to the lowered position along the track 16 when the spool 50 is in the locked position, such as when a force is applied downwardly. The bar 18 is spaced upwardly along the pillar 14 from the seatbelt retractor 42. The seatbelt webbing 20 extends from the seatbelt retractor 42, over the bar 18, through the D-ring 70, and to the anchor.

With reference to FIGS. 2-5B, the seatbelt assembly 38 includes the piston 22 supported by the pillar 14. Specifically, as shown in the Figures, the piston 22 may be supported by the track 16. The piston 22 may be between the bar 18 and the pillar 14 in both the raised position and the lowered position. The piston 22 may be elongated along the axis A between the bar 18 and the pillar 14. Specifically, in the example shown in the Figures, the piston 22 may be elongated along the axis A between the bar 18 and the track 16.

With reference to FIGS. 2-5B, the piston 22 may include the piston rod 24 connected to the bar 18 and the piston cylinder 28 supported by the pillar 14. Specifically, the piston cylinder 28 may be supported by the track 16. The piston rod 24 and the piston cylinder 28 may each be elongated along the axis A of the track 16. The piston cylinder 28 may be elongated from a top 54 to a bottom 56 and define a bore 58 elongated from the top 54 to the bottom 56. The bore 58 may have a constant cross-section along the axis A.

The piston rod 24 is insertable into the piston cylinder 28 through the bore 58 to define the volume 26. The volume 26 may have a constant cross-section along the axis A. The piston rod 24 may have a circular cross-section slightly smaller than a diameter of the bore 58 such that the piston rod 24 may be insertable into the piston cylinder 28. The piston rod 24 may be positioned in the bore 58 such that the piston rod 24 encloses the volume 26. The piston 22 may include an O-ring 72 extending around the piston rod 24 to form a seal between the piston rod 24 and the bore 58 of the piston cylinder 28.

The piston rod 24 may be linearly movable in the bore 58 by the bar 18. Specifically, the piston rod 24 may be movable along the axis A by the bar 18. In other words, the piston rod 24 is movable axially relative to the piston cylinder 28. The piston rod 24 moves between a raised position and a lowered position as the bar 18 moves between the raised position and the lowered position. Specifically, the piston rod 24 is in the raised position when the bar 18 is in the raised position and the piston rod 24 is in the lowered position when the bar 18 is in the lowered position. The seatbelt webbing 20 may apply a force downwardly along the axis A to the bar 18 to move the bar 18 and the piston rod 24 along the axis A toward the lowered position. The bar 18 and the piston rod 24 may move along the axis A toward the lowered position once the force reaches a non-zero threshold T. For example, the force may be by an occupant in the event of an impact to the vehicle 10. The movement of the bar 18 and the piston rod 24 downwardly along the axis A allows for payout of the seatbelt webbing 20 to apply a limited resistive load on an occupant of the seat 40.

With reference to FIGS. 3A and 3B, as the piston rod 24 moves from the raised position to the lowered position, the volume 26 becomes smaller. In other words, the volume 26 is smaller when the piston rod 24 and bar 18 are in the lowered positions than in the raised positions. The volume 26 defined by the piston rod 24 and piston cylinder 28 is proportional to the length B that the bar 18 moves along the slot 52 of the track 16 between the raised position and the lowered position. If the seatbelt webbing 20 applies a force downwardly along the axis A to the bar 18, the piston rod 24 moves toward the lowered position and the volume 26 decreases.

With reference to FIGS. 5A-6B, the seatbelt assembly 38 includes the resilient material 30 enclosed in the piston 22. A resilient material 30 is enclosed by the piston rod 24 and the piston cylinder 28 in the volume 26. In other words, the volume 26 is filled with the resilient material 30 to prevent the resilient material 30 from freely flowing out of the volume 26. The volume 26 may contain only the resilient material 30.

The piston rod 24 is between the bar 18 and the resilient material 30. As stated previously, as the bar 18 moves downwardly, the piston rod 24 moves downwardly to the lowered position. The resilient material 30 biases the piston rod 24 toward the raised position. Specifically, the resilient material 30 biases the piston rod 24 toward the raised position and the piston rod 24 biases the bar 18 along the slot 52 toward the raised position. In other words, when the downward force on the bar 18 has not reached the non-zero threshold T, the resilient material 30 maintains the piston rod 24 in the raised position. As the force on the bar 18 reaches the non-zero threshold T, the piston rod 24 and the bar 18 may move toward the lowered position. The downward movement of the bar 18 and the piston rod 24 acts as a load limiting device of the seatbelt assembly 38, e.g., replacing a torsion bar of the seatbelt retractor 42. The resilient material 30 may compress as the bar 18 and the piston rod 24 move toward the lowered position to manage energy in the event of sudden deceleration of the vehicle 10 and allow additional payout of the seatbelt webbing 20. The downward movement of the bar and the piston rod 24 allow for the seatbelt webbing 20 to have additional payout once the non-zero threshold T is met to limit the force by the seatbelt webbing 20 on an occupant in the event of an impact causing the sudden deceleration of the vehicle 10.

The resilient material 30 is a substance that is reversibly compressible. In other words, the resilient material 30 is able to be compressed into a smaller volume 26 and then expand back to an original volume. The resilient material 30 may be solid, liquid 60, gas, or a combination of two or three of solid, liquid 60, and gas.

Figure 6A:
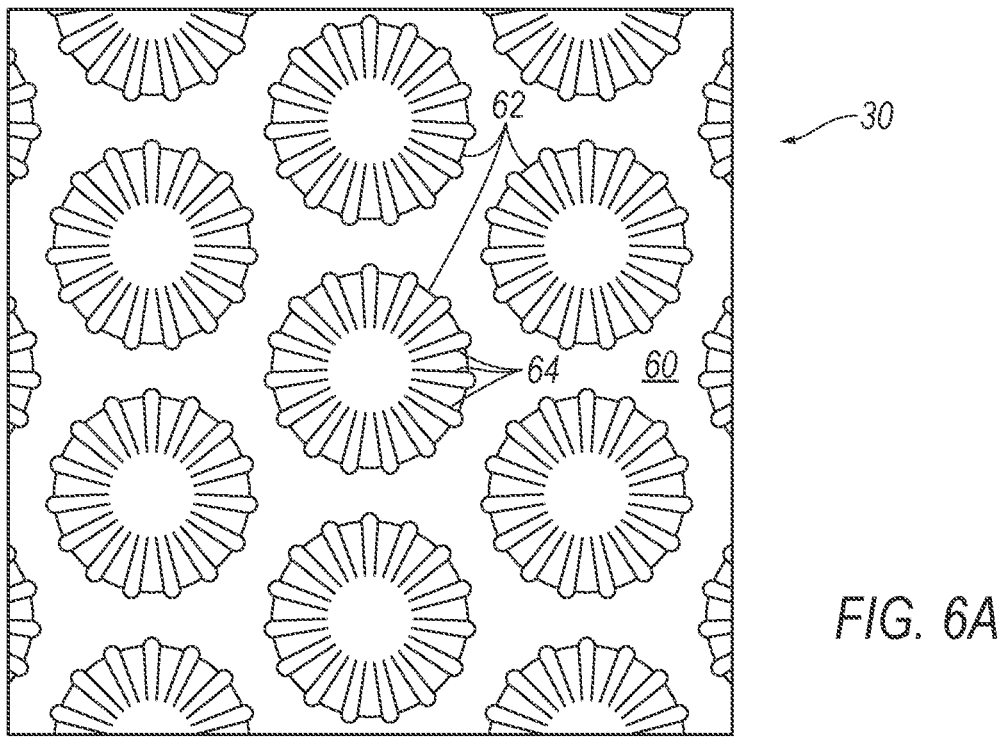
FIG. 6A is a schematic representation of a mixture including nanoporous particles.
Figure 6B:
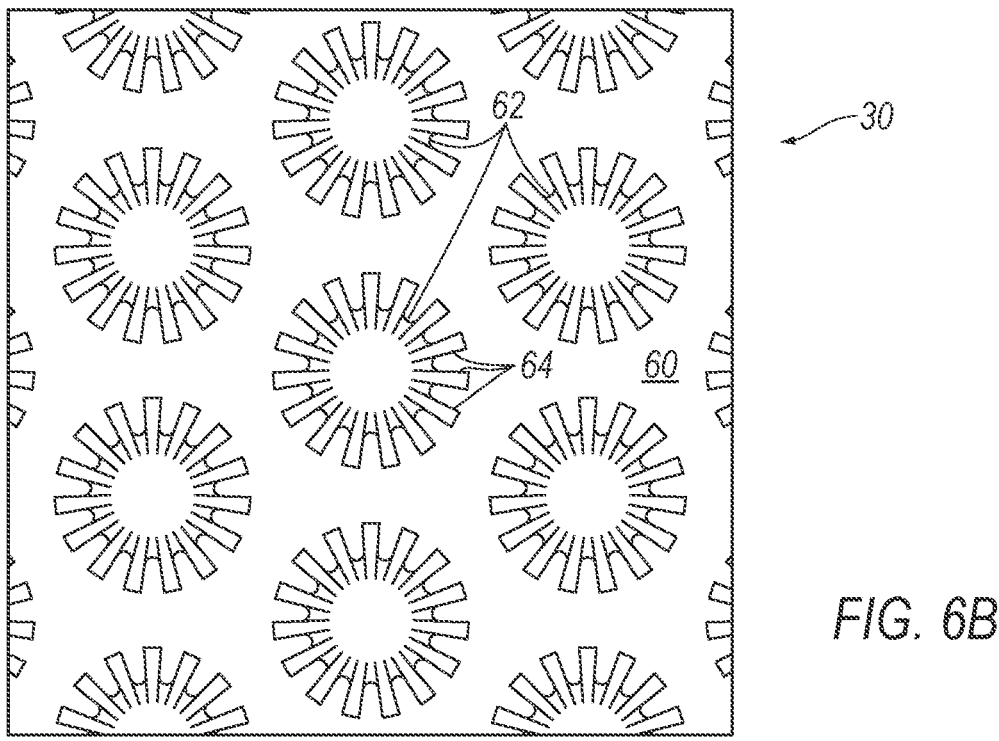
FIG. 6B is a schematic representation of a mixture including nanoporous particles.

With reference to FIGS. 6A and 6B, the resilient material 30 may be a heterogeneous mixture of a liquid 60 and hydrophobic, nanoporous particles 62. A "heterogeneous mixture" is made of different substances that remain separate, e.g., a colloid or a suspension. For example, the heterogeneous mixture may be a colloid of the hydrophobic, nanoporous particles 62 in the liquid 60. The liquid 60 may be any inert, i.e., nonreactive, liquid 60, e.g., water, lithium chloride, etc.

The particles 62 are nanoporous; in other words, the particles 62 have nanopores 64. The nanopores 64 may have diameters on the order of 1 nm to 100 nm. The particles 62 may be formed of, e.g., silica. The particles 62 are hydrophobic, i.e., tending to repel water. The particles 62 may be formed of a material that is hydrophobic, or the particles 62 may have a hydrophobic surface treatment, e.g., chlorotrimethylsilane or chlorodimethyloctylsilane in toluene.

Figure 7:
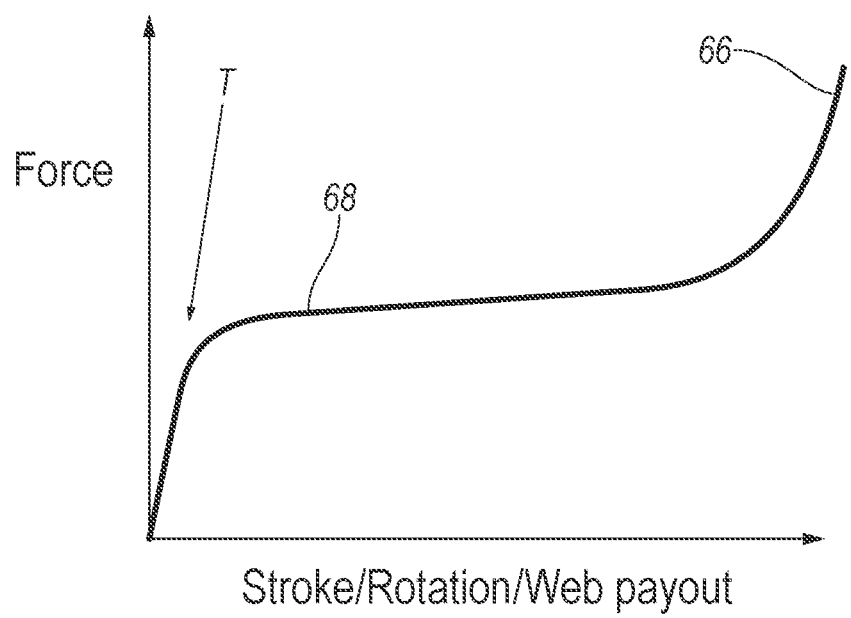
FIG. 7 is a graph of a simulation of a force versus change in stroke of the piston, rotation of the seatbelt assembly spool, and seatbelt webbing payout.

FIG. 7 is a graph of a simulation of a curve 66 describing the relationship between the force of the piston rod 24 on the heterogeneous mixture and the stroke of the piston 22, rotation of the spool 50, and the seatbelt webbing 20 payout. As the volume 26 occupied by the resilient material 30 decreases, the pressure, i.e., force, initially increases relatively steeply to the non-zero threshold T. As the volume 26 continues to decrease, the force nears a plateau and does not increase or increases only relatively slowly, as shown over a plateau region 68 of the curve 66. Over the plateau region 68, the slope of the curve 66, that is, the rate of change of the force relative to stroke, rotation, and payout is less than the slope of other regions of the curve 66. After the plateau region 68, as the volume 26 continues to decrease, the force rises more quickly than in the plateau region 68 due to the heterogeneous mixture reaching a maximum compression.

With reference to FIGS. 6A and 6B, physically, before the volume 26 reduces, air fills the nanopores 64 of the particles 62, and surface tension prevents the liquid 60 from entering the nanopores 64, as shown in FIG. 6A. In the plateau region 68, the force becomes sufficient to overcome the surface tension, and the liquid 60 enters the nanopores 64 and compresses the air inside the nanopores 64, as shown in FIG. 6B. Once the nanopores 64 are mostly full of the liquid 60, as the volume 26 decreases, the pressure increases more substantially. The volume 26 may be reduced by as much as 80%. The non-zero threshold T and the length B of the plateau region 68 are affected by the choice of material for the particles 62, the average size of the particles 62, the number of nanopores 64 per particle, the average size of the nanopores 64, the surface treatment, and the choice of liquid 60.

With reference to FIGS. 3A-6B, the piston rod 24 is movable relative to the piston cylinder 28 from the raised position in which the nanopores 64 are substantially filled with air (i.e., completely filled with air except for possible material imperfections) to the lowered position in which the nanopores 64 are substantially filled with the liquid 60 (i.e., completely filled with liquid except for possible material imperfections). The volume 26 of the heterogeneous mixture when the piston rod 24 is in the lowered position may be at most half of the volume 26, i.e., half or less than half of the volume 26, e.g., as little as 20% of the volume 26, of the heterogeneous mixture when the piston rod 24 is in the raised position. As the piston rod 24 moves from the raised position to the lowered position, the force in the heterogeneous mixture follows the curve 66 in FIG. 7; because the volume 26 has a constant cross-sectional area, the distance traveled by the piston rod 24 is linearly related to the volume 26 reduction.

The piston rod 24 is movable relative to the piston cylinder 28 from the lowered position in which the nanopores 64 are substantially filled with the liquid 60 to the raised position in which the nanopores 64 are substantially filled with air. In other words, the compression is reversible. When the force on the piston rod 24 tending to compress the heterogeneous mixture is removed, the internal pressure of the heterogeneous mixture pushes the piston rod 24 away from the lowered position toward the raised position. The compression may be fully or partially reversible, that is, the internal pressure may fully move the piston rod 24 back to the raised position or a fraction of the way back to the raised position, such as 95%.

In the event of a sudden deceleration, such as caused by an impact, an occupant of the seat 40 may have forward momentum relative to the seat 40. The occupant pushes against the seatbelt webbing 20, putting the seatbelt webbing 20 under tension. The seatbelt webbing 20 pulls on the spool 50, the spool 50 locks and tends to rotate to unwrap the seatbelt webbing 20 from the spool 50. The seatbelt webbing 20 applies a force downwardly along the axis A to the bar 18. The bar 18, moves the piston rod 24 to compress the heterogeneous mixture in the volume 26 of the piston cylinder 28 once the force reached the non-zero threshold T. The seatbelt webbing 20 is allowed to payout as the heterogeneous mixture in the volume 26 is compressed and the load imparted by the seatbelt webbing 20 to the occupant is limited. Once the tension in the seatbelt webbing 20 is reduced back to normal levels, the piston rod 24 moves back toward the raised position. The piston 22 may thus be reusable.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
a vehicle body including a pillar;
a track supported by the pillar;
a bar supported by the track and slidable relative to the track from a raised position to a lowered position;
a seatbelt webbing extending over the bar; and
a piston supported by the pillar, the piston including a piston rod connected to the bar and a piston cylinder supported by the pillar, the piston rod and the piston cylinder defining a volume filled with a resilient material;
the track defining a slot elongated along the pillar;
the bar being slidable along the slot; and
the piston rod biasing the bar along the slot toward the raised position.

2. The vehicle of claim 1, wherein the resilient material is a heterogeneous mixture of a liquid and hydrophobic, nanoporous particles.

3. The vehicle of claim 1, wherein the volume is smaller in the lowered position than in the raised position.

4. The vehicle of claim 1, wherein the bar is movable a length along the track by the seatbelt webbing, the volume being proportional to the length the bar moves along the track.

5. The vehicle of claim 1, wherein the resilient material biases the piston rod toward the raised position.

6. The vehicle of claim 1, wherein the piston rod is between the bar and the resilient material.

7. The vehicle of claim 1, wherein the piston is supported by the track.

8. The vehicle of claim 1, wherein the bar is rotatable relative to the pillar.

9. The vehicle of claim 1, further comprising a second track spaced from the track, the bar being supported by the second track and slidable relative to the second track from the raised position to the lowered position.

10. The vehicle of claim 1, wherein the track is elongated along an axis, the piston rod being movable along the axis from the raised position to the lowered position.

11. The vehicle of claim 10, wherein the seatbelt webbing applies a force downwardly along the axis to the bar, the bar and the piston rod being movable downwardly along the axis when the force reaches a non-zero threshold.

12. The vehicle of claim 1, wherein the seatbelt webbing applies a force downwardly on the bar, the bar and the piston rod being movable downwardly along the track when the force reaches a non-zero threshold.

13. The vehicle of claim 12, wherein the volume decreases as the force is applied to the bar by the seatbelt webbing.

14. The vehicle of claim 1, wherein the piston rod is movable axially relative to the piston cylinder by the bar.

15. The vehicle of claim 1, further comprising a seatbelt retractor including a spool about which the seatbelt webbing is coiled, the spool being lockable and the bar being slidable to the lowered position along the track when the spool is locked.

16. An assembly comprising:
a track;
a bar supported by the track and slidable relative to the track from a raised position to a lowered position;
a seatbelt webbing extending over the bar; and
a piston including a piston rod connected to the bar and a piston cylinder, the piston rod and the piston cylinder defining a volume filled with a resilient material;
the resilient material is a heterogeneous mixture of a liquid and hydrophobic, nanoporous particles.

17. The assembly of claim 16, wherein the volume is smaller in the lowered position than in the raised position.

18. The assembly of claim 16, wherein the track defines a slot elongated along the pillar, the bar being slidable along the slot.

19. The assembly of claim 18, wherein the piston rod biases the bar along the slot toward the raised position.

20. A vehicle comprising:
a vehicle body including a pillar;
a track supported by the pillar;
a bar supported by the track and slidable relative to the track from a raised position to a lowered position;
a seatbelt webbing extending over the bar; and
a piston supported by the pillar, the piston including a piston rod connected to the bar and a piston cylinder supported by the pillar, the piston rod and the piston cylinder defining a volume filled with a resilient material;
the resilient material is a heterogeneous mixture of a liquid and hydrophobic, nanoporous particles.

* * * * *